US012112660B2

(12) United States Patent
Baron

(10) Patent No.: US 12,112,660 B2
(45) Date of Patent: Oct. 8, 2024

(54) SIGNAGE SYSTEM FOR ATTACHING A LOW COST SIGN TO A GROUND POST

(71) Applicant: Steven R. Baron, Toronto (CA)

(72) Inventor: Steven R. Baron, Toronto (CA)

( * ) Notice: Subject to any disclaimer, the term of this patent is extended or adjusted under 35 U.S.C. 154(b) by 92 days.

(21) Appl. No.: 17/821,142

(22) Filed: Aug. 19, 2022

(65) Prior Publication Data

US 2024/0062684 A1 Feb. 22, 2024

(51) Int. Cl.
*G09F 7/18* (2006.01)

(52) U.S. Cl.
CPC ........ *G09F 7/18* (2013.01); *G09F 2007/1808* (2013.01); *G09F 2007/1843* (2013.01)

(58) Field of Classification Search
CPC ............... G09F 7/18; G09F 2007/1808; G09F 2007/1843
See application file for complete search history.

(56) References Cited

U.S. PATENT DOCUMENTS 694,809 A * 3/1902 Voigt ........................ G09F 3/04 40/310
1,025,861 A * 5/1912 Case ........................ B61K 1/02 258/3
1,040,749 A * 10/1912 Petri ......................... G09F 3/16 40/313
1,273,038 A * 7/1918 Crowell ................... B42D 9/00 40/659
1,651,652 A * 12/1927 Weeks .................... G09F 3/206 40/659
1,954,696 A * 4/1934 Genda ....................... G09F 1/10 248/490
2,143,343 A * 1/1939 Cooper ................... G09F 23/06 40/659
2,227,152 A * 12/1940 Pidot ....................... A47F 11/00 40/607.1
2,328,807 A * 9/1943 Hoofer ...................... G09F 3/18 40/651
2,809,453 A * 10/1957 Pawelka ................... G09F 7/18 40/603
2,924,901 A * 2/1960 Nicholas ................... G09F 3/16 40/659
2,951,303 A * 9/1960 Hovlid .................... A47F 7/143 D11/118
3,037,311 A * 6/1962 Ross ......................... G09F 7/18 248/230.9
3,239,957 A * 3/1966 Snediker ................. G09F 17/00 116/63 R (Continued)

*Primary Examiner* — David R Dunn
*Assistant Examiner* — Christopher E Veraa
(74) *Attorney, Agent, or Firm* — LaMorte & Associates PC

(57) ABSTRACT

A signage system that is used to mount a sign atop a post so that the sign is higher than the post. A wire frame connects the sign to the top of a post. The wire frame has support sections that extend into a sign through the bottom edge of the sign. The wire frame also has mounting sections that extend away from the sign and are sized and shaped to engage the open top end of a post. The wire frame further includes lateral sections that extend between the support sections and the mounting sections. The lateral sections are aligned along a common line that runs parallel to the bottom edge of the sign. The support sections, lateral sections, and mounting sections are all coplanar.

16 Claims, 7 Drawing Sheets

(56) References Cited

U.S. PATENT DOCUMENTS 3,494,057 A * 2/1970 Ford ........................ G09F 1/10 40/659
3,889,409 A * 6/1975 Thomas .................... G09F 1/14 40/607.04
3,898,743 A * 8/1975 Myeress ................ G01C 15/06 40/659
3,963,126 A * 6/1976 Taub ......................... A47F 5/02 40/611.12
4,009,532 A * 3/1977 Thomas .................... G09F 1/10 40/658
4,103,445 A * 8/1978 Smith ....................... G09F 7/00 248/156
4,131,079 A * 12/1978 Rousseau, Jr ........ G09F 13/165 116/22 A
4,452,416 A * 6/1984 Templeton ................ G09F 1/10 40/607.04
4,524,533 A * 6/1985 Still, Jr. .................. G09F 21/04 40/607.04
4,660,310 A * 4/1987 Farmer ............... G09F 15/0006 40/607.06
4,864,757 A * 9/1989 Lovett ....................... G09F 7/18 24/561
4,885,860 A * 12/1989 Huenefeld ................ G09F 7/18 40/607.06
4,894,937 A * 1/1990 Davis ........................ G09F 7/18 248/248
5,042,183 A * 8/1991 Kennedy ................... G09F 7/18 248/156
5,307,580 A * 5/1994 Farmer ..................... G09F 7/18 248/156
5,375,355 A * 12/1994 Rhoads ..................... G09F 7/18 403/269
5,595,010 A * 1/1997 Fuller ................. G09F 15/0025 40/611.11
5,810,305 A * 9/1998 Heard ....................... G09F 7/18 248/230.8
5,878,517 A * 3/1999 Gill .......................... G09F 7/12 248/156
5,956,875 A * 9/1999 Aughenbaugh ........... G09F 7/10 256/48
6,170,183 B1 * 1/2001 Keefe ................. G09F 15/0006 248/156
6,397,451 B1 * 6/2002 Gill .......................... G09F 7/12 40/586
6,547,204 B1 * 4/2003 Peck ......................... G09F 7/18 248/545
7,437,844 B1 * 10/2008 Kennedy ................. G09F 15/00 40/607.05
7,506,466 B2 * 3/2009 Betham ................... G09F 17/00 248/302
7,743,539 B1 * 6/2010 Kennedy ............. G09F 15/0062 40/607.01
8,429,944 B2 * 4/2013 Liles ....................... B21F 15/04 72/135
8,701,322 B2 * 4/2014 Santarelli ................ G09F 23/06 40/659
8,984,783 B2 * 3/2015 Cepek ....................... G09F 7/22 40/607.05
9,275,563 B1 * 3/2016 Hartman ............. G09F 15/0018
10,283,021 B1 * 5/2019 Hartman ............. G09F 15/0012
11,688,306 B2 * 6/2023 Rios, Jr. .............. G09F 15/0062 40/607.05
2007/0209260 A1 * 9/2007 Tucker ...................... G09F 7/18 40/612
2013/0327915 A1 * 12/2013 O'Neal ................. G09F 15/005 248/545
2015/0007471 A1 * 1/2015 Cepek ....................... G09F 7/22 40/607.03

* cited by examiner

SIGNAGE SYSTEM FOR ATTACHING A LOW COST SIGN TO A GROUND POST

BACKGROUND OF THE INVENTION

1. Field of the Invention

In general, the present invention relates to the structure of signs that are specifically designed to attach to support posts. More particularly, the present invention relates to signage systems that are traditionally used to identify crops and fields in an agricultural setting.

2. Prior Art Description

There are many federal, state, and local regulations govern the use of signage in association with various types of crops. Signage is typically used to identify a crop and/or the seed stock used to produce the crops. In this manner, specialized crops, such as hybrid crops, genetically modified crops, and other engineered crops can be identified and kept separate from unmodified crops. Likewise, crops treated with various types of fertilizer, insecticides, or herbicides can be identified and kept separate from crops that are grown organically. Furthermore, many seed suppliers have proprietary seeds. Such seed suppliers often require the use of crop identification signs to ensure that the crops are harvested as crops and are not allowed to progress to seed. In this manner, a seed supplier can better control the supply and spread of their proprietary seed stock.

It is for these reasons that many farmed fields contain crop identification signage. Crops in fields are typically rotated and some fields are seeded more than once in a season. As a consequence, the signage used to identify the crop must also be periodically moved and/or changed. It is therefore very important to a farmer that the signage be inexpensive, easy to install, and durable enough to last in an open field.

Traditionally, crop identification signage is placed at the edge of a field so that the signage can be easily read. Crop identification signage is often affixed to reusable metal fence posts. In this manner, the posts can be moved and reused at different locations during different planting seasons. For the sake of economy and practicality, common commercial metal fence posts are most often used. Such fence posts are most commonly made from U-channel stock, round stock, or square stock. Such commercial posts are made in lengths typically extending between 1 meter and 1.5 meters above the ground when set. A printed sign is typically attached to a frame that holds the signage flat. The frame is attached to the support post using mechanical fasteners. Since the sign is attached to a frame and the frame is attached to the support post, the sign cannot extend significantly above the post. Rather, most of the sign extends along the length of the supporting post. If the sign is large, then the bottom of the sign may descend to a point that is vulnerable to being overgrown by weeds or by the crops the sign is used to identify.

The problems associated with placing a sign at a low elevation is also a primary reason why low-cost wire frame signage systems are not used for crop identification. In the marketplace, there are many low-cost signage systems that include a wire frame and a sign. Such signage systems are typically used for campaign signs or to advertise garage sales. In such signage systems, the wire framework serves both as a support post and as the sign frame. In order for the wire framework to have the strength to support the sign in weather, the framework must be made relatively short. The bottom of the wire framework is driven into the ground and the top of the wire framework is covered by the sign. The result is that the sign is typically less than ½ meter above the ground and is vulnerable to being overgrown by vegetation. Furthermore, should the sign fall over, the wire frameworks are very hard to see, and the wire framework can easily become entangled in any farm equipment that passes over the wire framework. Prior art signage systems that use wire frameworks are exemplified by U.S. Pat. No. 5,042,183 to Kennedy and U.S. Pat. No. 4,894,937 to Davis.

Farmers would like to have the low cost of a wire frame signage system with the height and stability of a traditional metal post signage system. The present invention sets forth a new signage system that meets this need. The new signage system is described and claimed below.

SUMMARY OF THE INVENTION

The present invention is a signage system that is used to mount a sign atop a post so that the sign is higher than the post. A wire frame connects the sign to the top of a post. The wire frame has support sections that extend into a sign through the bottom edge of the sign. The wire frame also has mounting sections that extend away from the sign and are sized and shaped to engage the open top end of a post. The wire frame further includes lateral sections that extend between the support sections and the mounting sections. The lateral sections are aligned along a common line that runs parallel to the bottom edge of the sign. The support sections, lateral sections, and mounting sections are all coplanar.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention signage system can be embodied in many ways, only a few exemplary embodiments are illustrated. The exemplary embodiments are being shown for the purposes of explanation and description. The exemplary embodiments are selected in order to set forth some of the best modes contemplated for the invention. The illustrated embodiments, however, are merely exemplary and should not be considered limitations when interpreting the scope of the appended claims.

Figure 1:
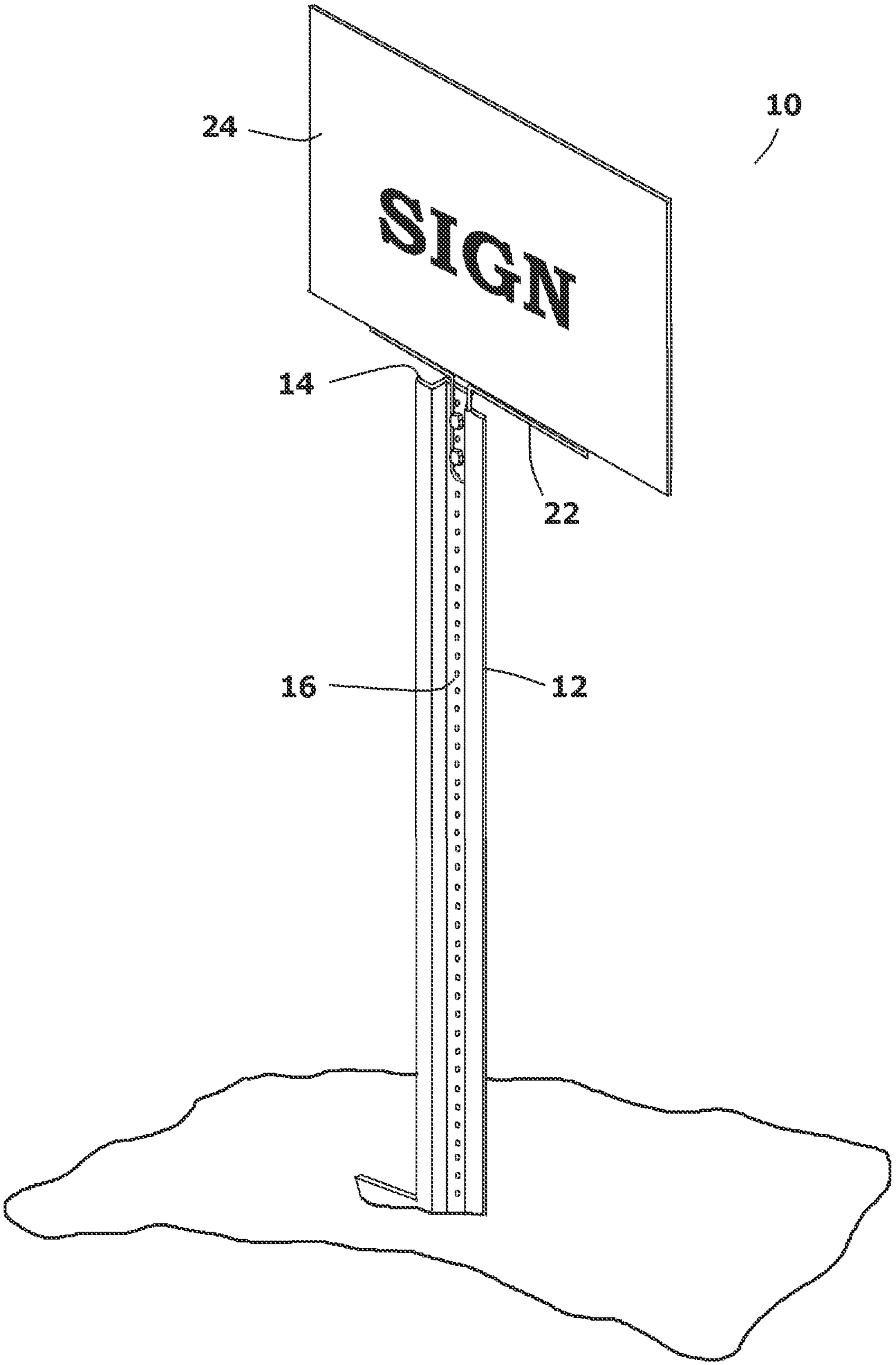
FIG. 1 shows an exemplary embodiment of a signage system in accordance with the present invention.
Figure 2:
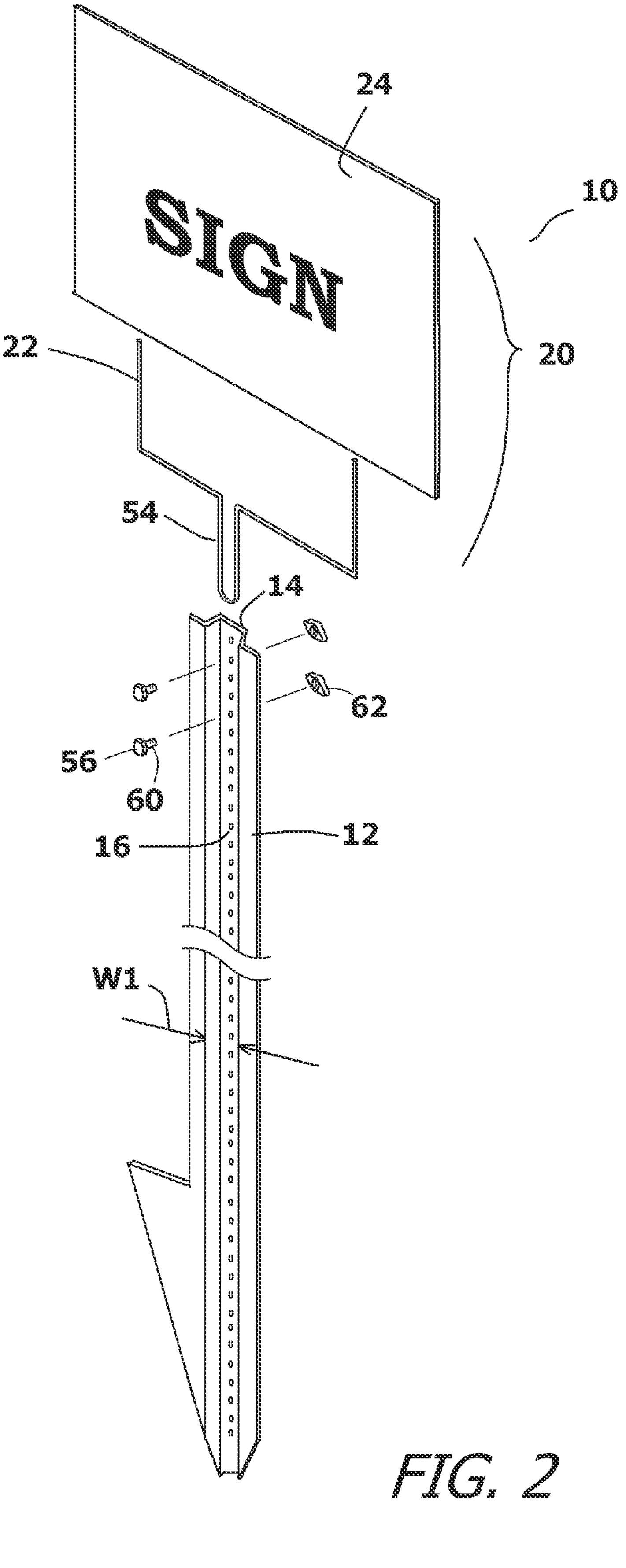
FIG. 2 is an exploded view of the exemplary embodiment of FIG. 1.

Referring to FIG. 1 and FIG. 2, a signage system is shown. The signage system 10 utilizes a commercial U-channel post 12 that can be set into the ground at the edge of a field. The U-channel post 12 terminates at a top end 14. Furthermore, the U-channel post 12 defines a U-channel 16 that has a width W1, wherein the U-channel 16 runs the length of the U-channel post 12. A sign assembly 20 attaches to the top end 14 of the U-channel post 12. The sign assembly 20 includes a wire frame 22 and a sign 24 that is supported by the wire frame 22. The wire frame 22 supports the sign 24 completely above the top end 14 of the U-channel post 12. In this manner, the sign 24 is more prominent and is less likely to be overgrown by vegetation.

Figure 3:
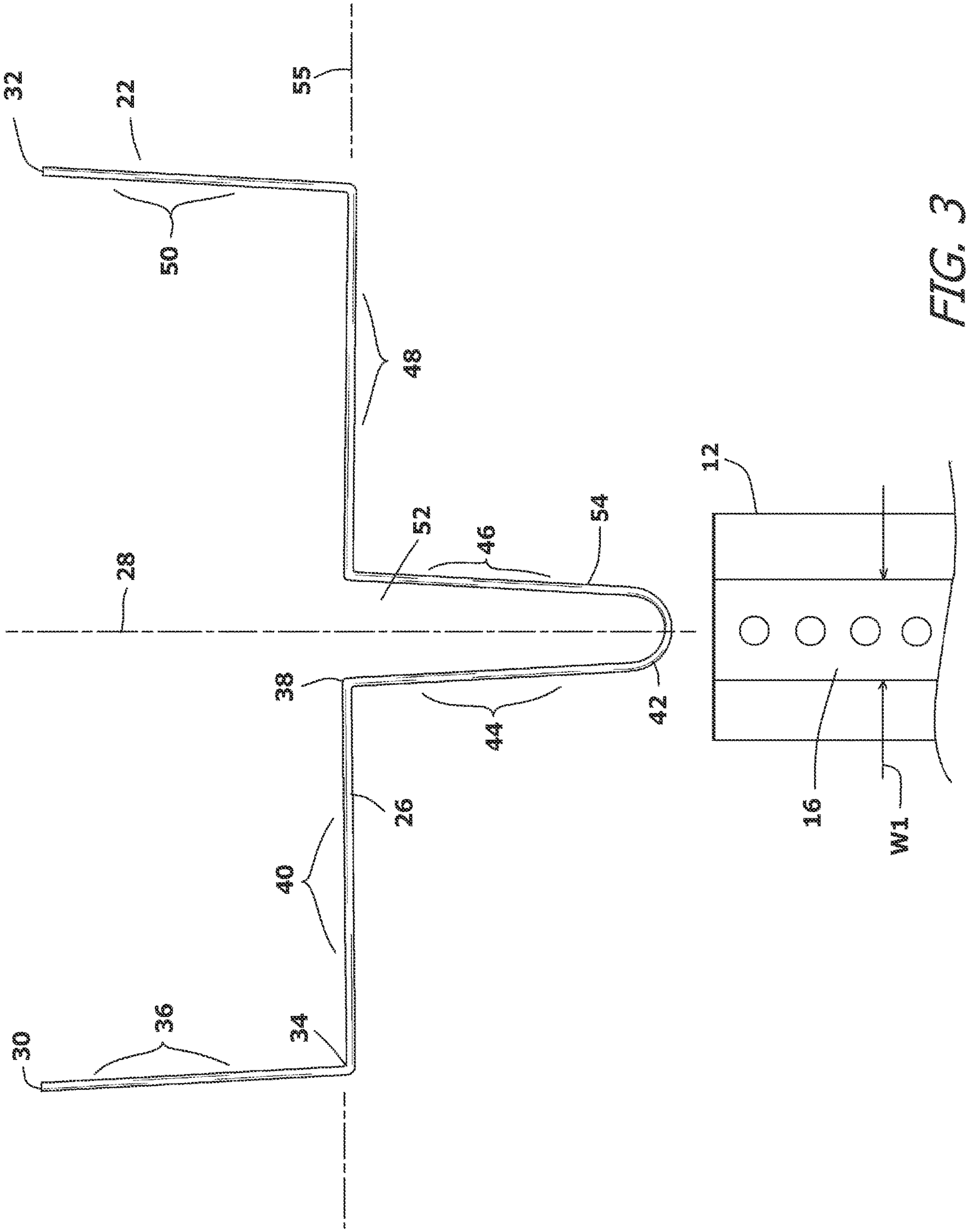
FIG. 3 is a front view of the wire frame used in the signage system.

Referring to FIG. 3 in conjunction with FIG. 1 and FIG. 2, it can be seen that a wire frame 22 mounts to the U-channel post 12. The wire frame 22 is made from a single length of wire 26 that is bent into shape. As such, the wire frame 22 can be made in a very simple and low cost manner. The wire frame 22 is bisected about an imaginary mid-line 28, wherein the wire frame 22 is bent into mirrored shapes on either side of the mid-line 28. The length of wire 26 that forms the wire frame 22 has a first end 30 and an opposite second end 32. The wire frame 22 is straight from the first end 30 to a first right angle bend 34. This forms a first sign support section 36 that is parallel to, or near parallel to, the midline 28. After the first right angle bend 34, the length of wire 26 extends straight in a direction perpendicular to the midline 28 from the first right angle bend 34 to a second right angle bend 38. This forms a first lateral section 40. The length of wire 26 then extends vertically from the second right angle 38 to a reverse bend 42. This forms a first mounting section 44. The reverse bend 42 is bisected by the midline 28 and the bend pattern reverses on the opposite side of the mid-line 28. As such, there is a second mounting section 46, a second lateral section 48 and a second sign support section 50.

The reverse bend 42 has a radiused turn that separates the first mounting section 44 from the second mounting section 46. The first mounting section 44 and the second mounting section 46 diverge slightly from the reverse bend 42. However, due to the flexibility of the length of wire 26, the first mounting section 44 and the second mounting section 46 can be moved into a parallel orientation where both mounting sections 44, 46 are parallel to the midline 28 and to each other. When moved into a parallel orientation, the first mounting section 44 and the second mounting section 46 are separated by a gap space 52 and are a first distance apart. The first distance is equal to, or slightly smaller than, the width W1 of the U-channel 16 on the U-channel post 12. The first mounting section 44, the second mounting section 46, and the reverse bend 42 combine to form a mounting extension 54 on the wire frame 22.

After bending, it can be seen that all the sections of the length of wire 26 are coplanar. The first lateral section 40 and the second lateral section 48 are colinear and extend along a common line 55 that is perpendicular to the midline 28. The first sign support section 36 and the second sign support section 50 extend away from the common line 55 in a first direction at or near perpendicular angles. The first and second mounting sections 44, 46 both extend away from the common line 55 in an opposite second direction.

Figure 4:
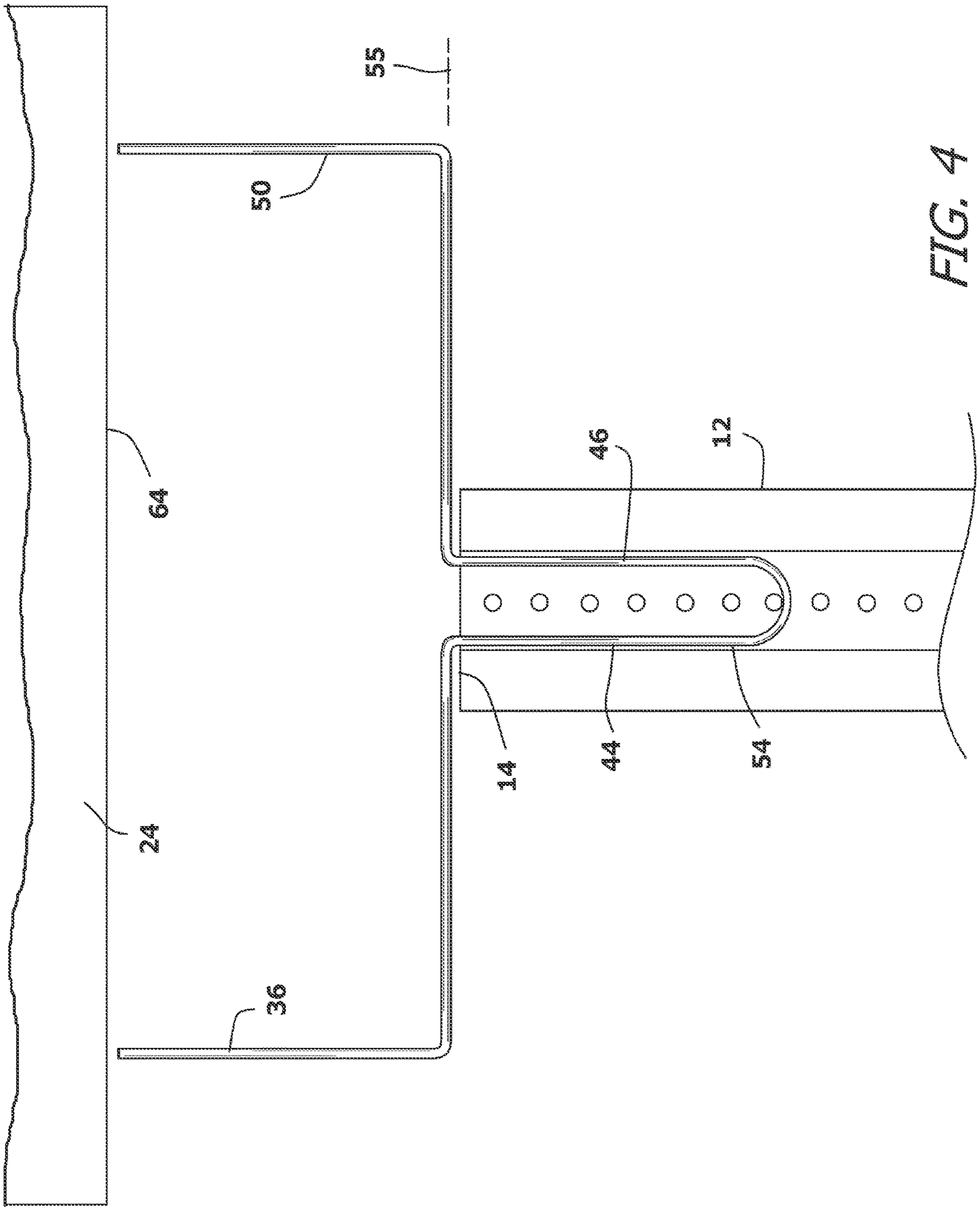
FIG. 4 is an enlarged view of the wire frame and the top of the post used in the exemplary embodiment of FIG. 1.

Referring to FIG. 4 in conjunction with FIG. 3 and FIG. 2, it can be seen that the mounting extension 54 can be inserted into the top end 14 of the U-channel post 12. In order to fit, the first mounting section 44 and the second mounting section 46 are slightly moved together until parallel. Once the first mounting section 44 and the second mounting section 46 are parallel, the whole mounting extension 54 can be placed into the U-channel 16 of the U-channel post 12. The reverse bend 42 slightly biases the first mounting section 44 and the second mounting section 46 apart. This spring bias causes the mounting extension 54 to engage the U-channel 16 and remain in place until secured.

To secure the mounting extension 54 in place, mechanical fasteners 56 are advanced through existing holes 57 in the U-channel post 12. Each fastener 56 includes a nut 58, and bolt 60. The nut 58 can be a wingnut or knob nut that can be tightened by hand.

The sign 24 attaches to the wire frame 22. The sign 24 has corrugated core construction that enables the first sign support section 36 and the second sign support section 50 of the wire frame 22 to extend into the sign 24 through the bottom edge 64 of the sign 24. The bottom edge 64 of the sign 24 is parallel to the common line 55 of the wire frame 22, wherein the bottom edge 64 can come to rest on the first lateral section and the second lateral section 48 forming the common line 55. Once attached, it will be understood that the bottom edge 64 of the sign 24 is supported at the same general elevation as is the top end 14 of the U-channel post 12. The sign 24, therefore, extends above the U-channel post 12. The effective length of the overall signage system 10 is therefore increased, wherein the full length of the signage system 10 is equal to the combined length of the sign 24 and the section of the U-channel post 12 that extends aboveground. This added elevation makes the sign 24 more prominent and less likely to be overgrown by vegetation without having to increase the size and cost of the supporting post 12.

Figure 5:
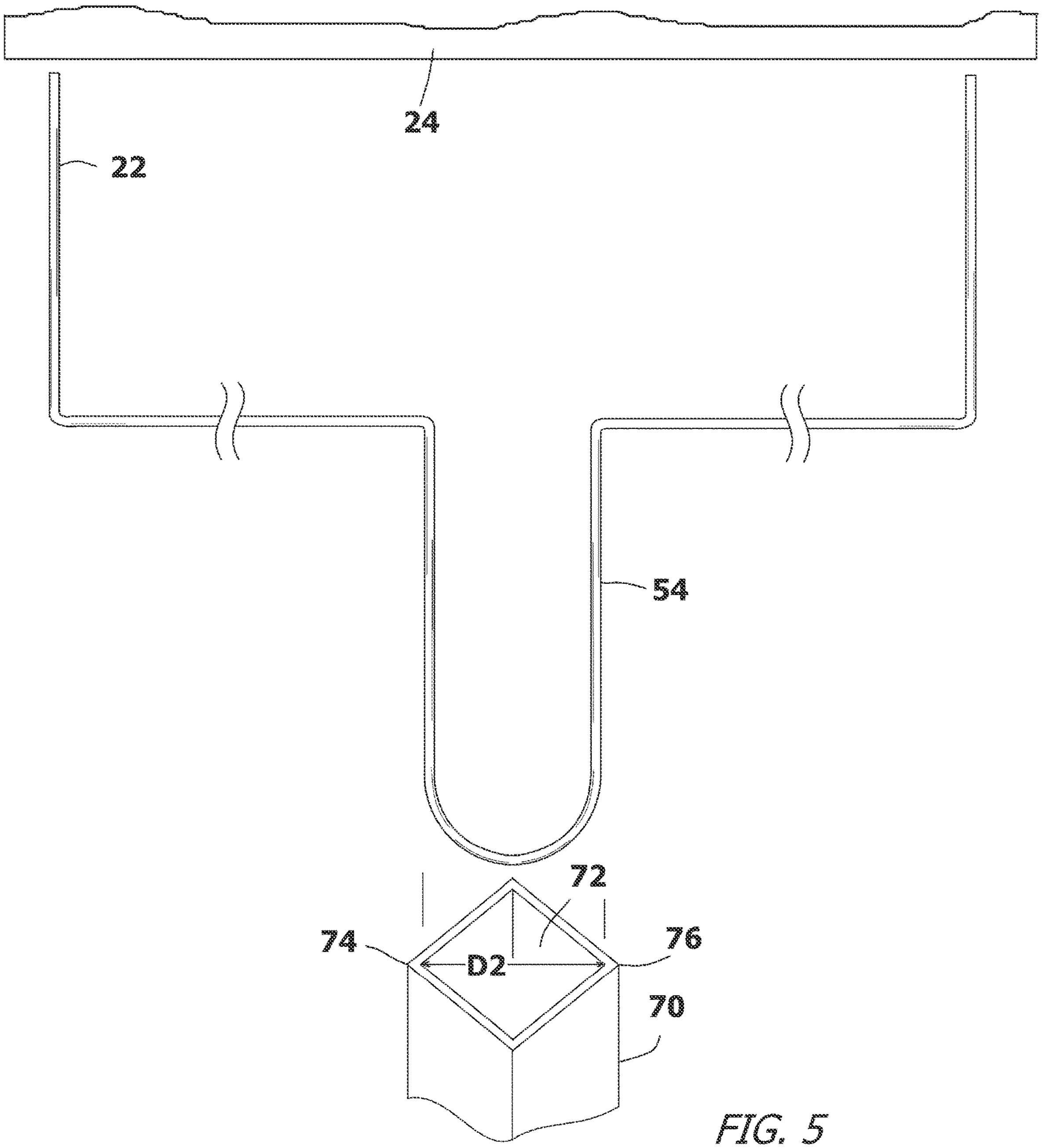
FIG. 5 is an alternate embodiment, showing how the wire frame of the signage system engages the diagonal opening of a square channel post.

Referring to FIG. 5, a second embodiment is shown that utilizes the same wire frame 22 and sign 24. Accordingly, the same reference numbers are used to identify the same elements that were previously described. In FIG. 5, a different post is shown. In this embodiment, a square tube post 70 is provided. The square tube post 70 has an open top end 72. The open top end 72 has a diagonal distance D2 between diagonal corners 72, 76. The mounting extension 54 of the wire frame 22 is sized so that the mounting extension 54 just fits diagonally into the open top end 72 of the square tube post 70 between the diagonal corners 74, 76. The mounting extension 54 can be further anchored in place by extending mechanical fasteners 78 through both the square tube post 70 and the gap space 52 in the center of the mounting extension 54.

Figure 6:
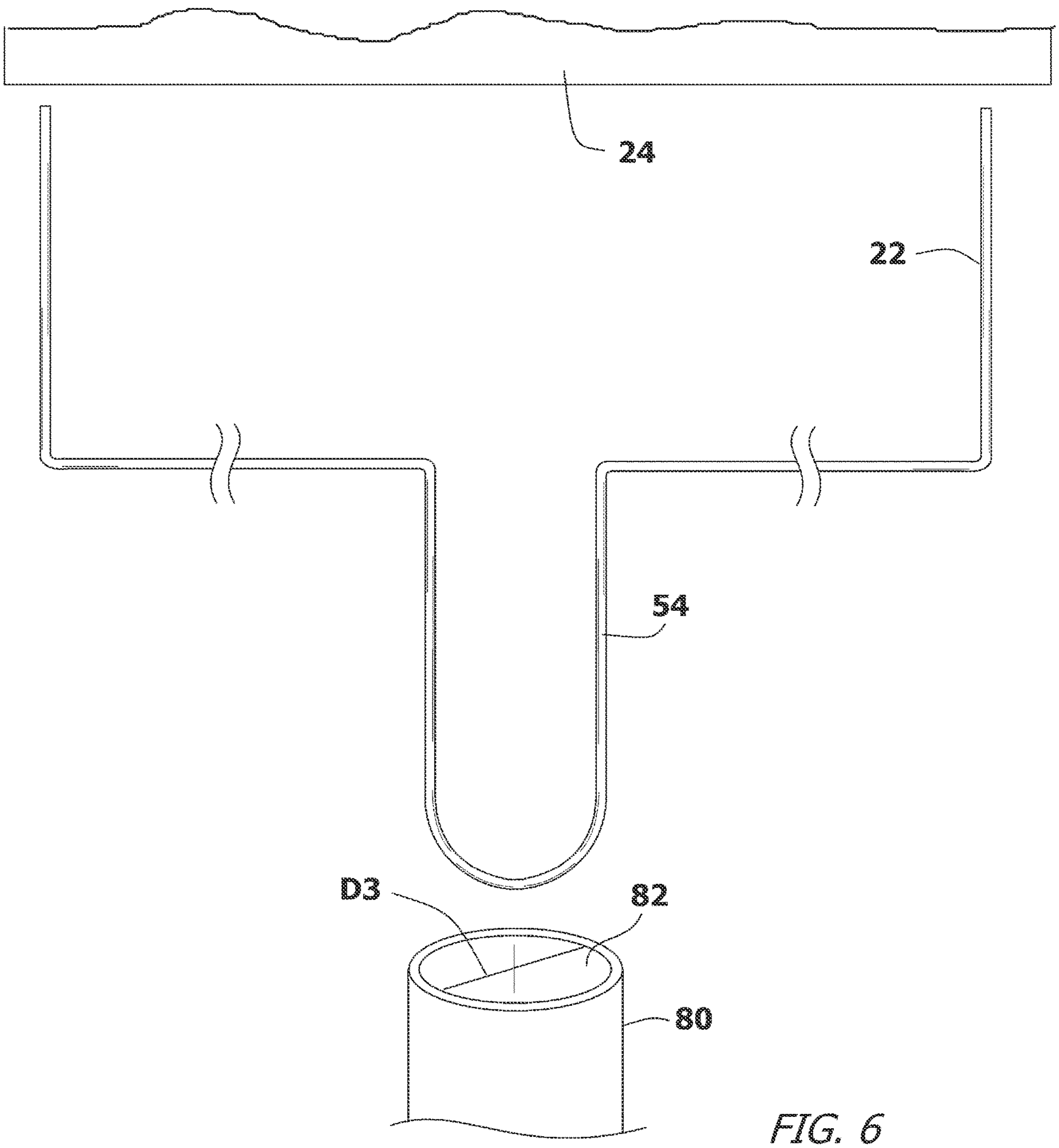
FIG. 6 is an alternate embodiment, showing how the wire frame of the signage system engages the circular opening of a round pipe post.

Referring to FIG. 6, another embodiment is shown that also uses the same wire frame 22 and sign 24. Accordingly, the same reference numbers are used to identify the same elements that were previously described. In FIG. 6, a different post is shown. In this embodiment, a round pipe post 80 is provided. The round pipe post 80 has an open top end 82. The open top end 82 has an internal diameter D3. The mounting extension 54 of the wire frame 22 is sized so that the mounting extension 54 just fits into the open top end 82 of the round pipe post 80. The mounting extension 54 can be further anchored in place by extending mechanical fasteners 84 through both the round pipe post 80 and the gap space 52 in the center of the mounting extension 54.

Figure 7:
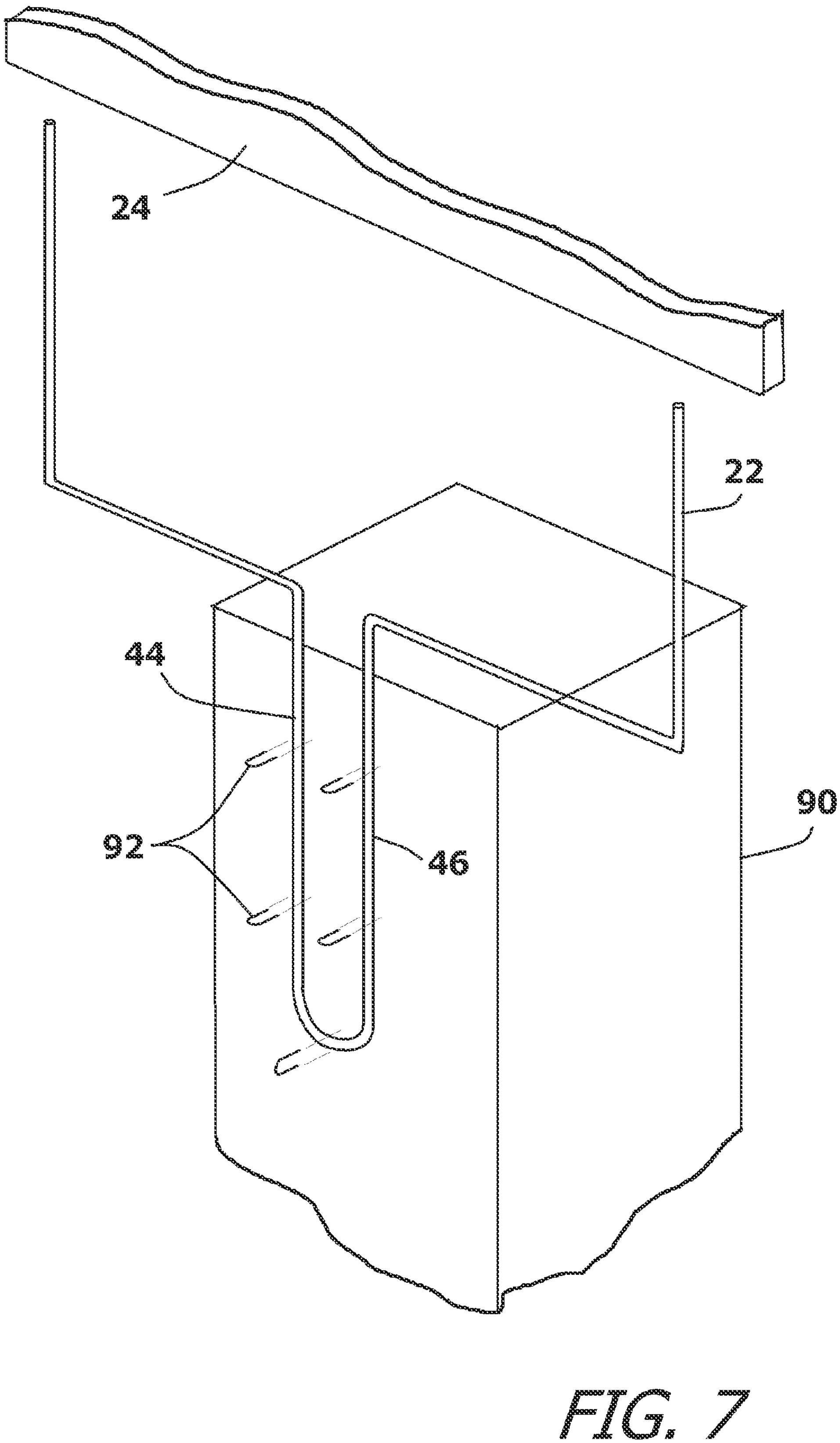
FIG. 7 is an alternate embodiment, showing how the wire frame of the signage system engages a wooden post.

Referring to FIG. 7, a fourth embodiment is shown that uses the same wire frame 22 and sign 24. Accordingly, the same reference numbers are used to identify the same elements that were previously described. In FIG. 7, the wire frame 22 is attached to a wooden post 90. This can be accomplished in many ways using a variety of fasteners. In one of the simplest methods, staples 92 are used. The first mounting section 44 and the second mounting section 46 are stapled to the wooden post 90, as is the reverse bend 42. These points of attachment firmly affix the wire frame 22 to the wooden post 90. Furthermore, the wire frame 22 is still able to support the sign 24 above the top of the wooden post 90.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A signage system, comprising:

a post having an open top end;

a sign having a bottom edge;

a single length of wire bent into a wire frame having support sections that extend into said sign through said bottom edge and mounting sections that extend into said post through said open top end, therein connecting said sign to said post;

wherein said wire frame has lateral sections that extend between said support sections and said mounting sections, wherein said lateral sections are aligned along a common line, wherein said wire frame is symmetrically formed about a midline that is perpendicular to said common line, wherein said mounting sections include a first mounting section and a second mounting section that are symmetrically disposed on opposite sides of said midline, and wherein said first mounting section and said second mounting section are connected by a radiused bend that is bisected by said midline.

2. The system according to claim 1, wherein said support sections, said lateral sections, and said mounting sections are all coplanar.

3. The system according to claim 2, wherein said support sections extend in a first direction from said common line and said mounting sections extend in a second direction from said common line that is opposite said first direction.

4. The system according to claim 3, wherein said length of wire has a first end and an opposite second end, wherein said support sections include a first support section and a second support section, wherein said first support section terminates at said first end of said length of wire and said second support section terminates at said second end of said length of wire.

5. The system according to claim 1, wherein said first mounting section and said second mounting section diverge from said radiused bend.

6. The system according to claim 5, wherein said open top end of said post defines an opening of a first width, wherein said mounting sections are sized to fit within said opening.

7. The system according to claim 6, wherein said radiused bend enables said mounting sections to be slightly deformed for said mounting sections to pass into said open top end of said post.

8. The system according to claim 1, wherein a gap space is disposed between said first mounting section and said second mounting section, said system further including mechanical fasteners that pass into said post and through said gap space of said mounting sections within said post.

9. A signage system, comprising:

a planar sign having a bottom edge;

a wire frame having support sections that extend into said sign through said bottom edge and mounting sections that extend away from said sign, said wire frame further including lateral sections that extend between said support sections and said mounting sections, wherein said mounting sections include a first mounting section, a second mounting section, and a gap space that is disposed between said first mounting section and said second mounting section, wherein said first mounting section and said second mounting section are connected across said gap by a radiused bend, wherein said lateral sections are aligned along a common line, wherein said support sections, said lateral sections, and said mounting sections are all coplanar, and mechanical fasteners that pass into said post and through said gap space of said mounting sections within said post.

10. The system according to claim 9, wherein said wire frame is made from a single length of wire that is bent into said wire frame.

11. The system according to claim 10, wherein said support sections extend from said common line in a first direction and said mounting sections extend from said common line in a second direction that is opposite said first direction.

12. The system according to claim 11, wherein said length of wire has a first end and an opposite second end, wherein said support sections include a first support section and a second support section, wherein said first support section terminates at said first end of said length of wire and said second support section terminates at said second end of said length of wire.

13. The system according to claim 9, wherein said wire frame is symmetrically formed about a midline, wherein said midline is perpendicular to said common line.

14. The system according to claim 13, wherein said radiused bend is bisected by said midline.

15. The system according to claim 14, wherein said first mounting section and said second mounting section diverge from said radiused bend.

16. A signage system, comprising:

a post having an open top end;

a sign having a bottom edge;

a single length of wire bent into a wire frame having support sections that extend into said sign through said bottom edge and mounting sections that extend into said post through said open top end, wherein said mounting sections include a first mounting section, a second mounting section, and a gap space that is disposed between said first mounting section and said second mounting section, mechanical fasteners that pass into said post and through said gap space of said mounting sections within said post, therein connecting said sign to said post.

* * * * *